(12) United States Patent
Kunze et al.

(10) Patent No.: US 7,937,532 B2
(45) Date of Patent: May 3, 2011

(54) METHOD AND APPARATUS FOR SPECULATIVE PREFETCHING IN A MULTI-PROCESSOR/MULTI-CORE MESSAGE-PASSING MACHINE

(75) Inventors: Aaron Kunze, Portland, OR (US); Erik J. Johnson, Portland, OR (US); Hermann Gartler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 11/731,280

(22) Filed: Mar. 30, 2007

(65) Prior Publication Data

US 2008/0244231 A1    Oct. 2, 2008

(51) Int. Cl.
*G06F 13/00* (2006.01)
(52) U.S. Cl. ......... 711/137; 711/130; 711/148; 711/154
(58) Field of Classification Search .................. 711/130, 711/137, 148, 154
See application file for complete search history.

(56) References Cited

U.S. PATENT DOCUMENTS

| | | | |
|---|---|---|---|
| 6,738,836 B1 | 5/2004 | Kessler et al. | |
| 7,500,031 B2 * | 3/2009 | Pong | 710/58 |
| 2003/0126186 A1 | 7/2003 | Rodgers et al. | |
| 2004/0073905 A1 | 4/2004 | Emer et al. | |
| 2004/0260883 A1 | 12/2004 | Wallin et al. | |
| 2006/0085602 A1 | 4/2006 | Huggahalli et al. | |
| 2006/0161738 A1 * | 7/2006 | Saha et al. | 711/150 |
| 2007/0005909 A1 * | 1/2007 | Cai et al. | 711/146 |
| 2008/0080491 A1 * | 4/2008 | Saripalli | 370/378 |
| 2008/0189252 A1 * | 8/2008 | Branscome et al. | 707/3 |

OTHER PUBLICATIONS

Office Action received for Chinese Patent Application No. 200810128793.X, mailed on Jan. 8, 2010, 5 pages of Chinese Office Action included 2 pages of English translation.
Office Action received for European Patent Application No. 05253896.4, mailed on May 2, 2008, 5 pages.

* cited by examiner

*Primary Examiner* — Reba I Elmore
(74) *Attorney, Agent, or Firm* — Joni D. Stutman

(57) ABSTRACT

In some embodiments, the invention involves a novel combination of techniques for prefetching data and passing messages between and among cores in a multi-processor/multi-core platform. In an embodiment, a receiving core has a message queue and a message prefetcher. Incoming messages are simultaneously written to the message queue and the message prefetcher. The prefetcher speculatively fetches data referenced in the received message so that the data is available when the message is executed in the execution pipeline, or shortly thereafter. Other embodiments are described and claimed.

27 Claims, 7 Drawing Sheets

METHOD AND APPARATUS FOR SPECULATIVE PREFETCHING IN A MULTI-PROCESSOR/MULTI-CORE MESSAGE-PASSING MACHINE

FIELD OF THE INVENTION

An embodiment of the present invention relates generally to message passing in a multi-processor/multi-core platform and, more specifically, to a novel combination of techniques for prefetching data and passing messages between and among cores.

BACKGROUND INFORMATION

Various hardware mechanisms exist in multi-processor and/or multi-core systems to enable individual cores to send messages between the individual cores. For example, the Intel IXP2xxx series of network processors has multiple hardware mechanisms for sending 32-bit messages from one core to another. Also, many microprocessor cores have speculative prefetching hardware that fetches data from one level of the memory hierarchy to one or more levels higher. For example, if a processor detects that the software running on it is repeatedly accessing data with a constant stride, the processor may speculatively fetch the data the processor expects the software will request next.

Often, a message passed between cores will contain an address reference, or pointer. In existing systems, a receiving core's execution pipeline dereferences the pointer and fetches the data from the memory location, as needed. Significant delays may occur waiting for the data to be retrieved before the instruction in the execution pipeline can be performed. One implementation for message passing is described in "*IXP2400/2800 Programming: The Complete Microengine Coding Guide*," by Erik J. Johnson and Aaron R. Kunze (INTEL PRESS 2003). Chapter 10 describes message passing.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to integrating prefetching and message passing among cores. Embodiments of the present invention avoid untimely retrieval of information from remote physical memory or the cache of another processor, as is the case with existing systems. In embodiments of the present invention, data is much more likely to be already in, or on its way, to the local cache when a pointer is dereferenced.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Embodiments of the present invention allow software to specify to a processor core that one or more inter-core messages specify as a physical address. When a message is received that contains a physical address, the message is put on a hardware queue waiting for software on the receiving core to consume it. While the message is being queued, the address in the message is sent to a hardware prefetcher to enable a speculative prefetch of the data under the assumption that the code running on the receiving processor will soon access this data. Optionally, the message may also specify the number of bytes to prefetch. The application, after fetching the message, will typically be able to immediately access the data associated with the message.

In an existing system, hardware prefetchers may be used in conjunction with the execution pipeline. Instructions that are in the pipeline may have data prefetched so when the instruction is ready to execute, the data is immediately available. However, these prefetchers require an instruction to be put into the execution pipeline before prefetching is attempted. In contrast, embodiments of the present invention have a prefetcher integrated with the core to core (core-core) message passing mechanism, so that data required from memory or another core's cache may be available sooner than would be possible using only execution pipeline prefetchers.

Figure 1:
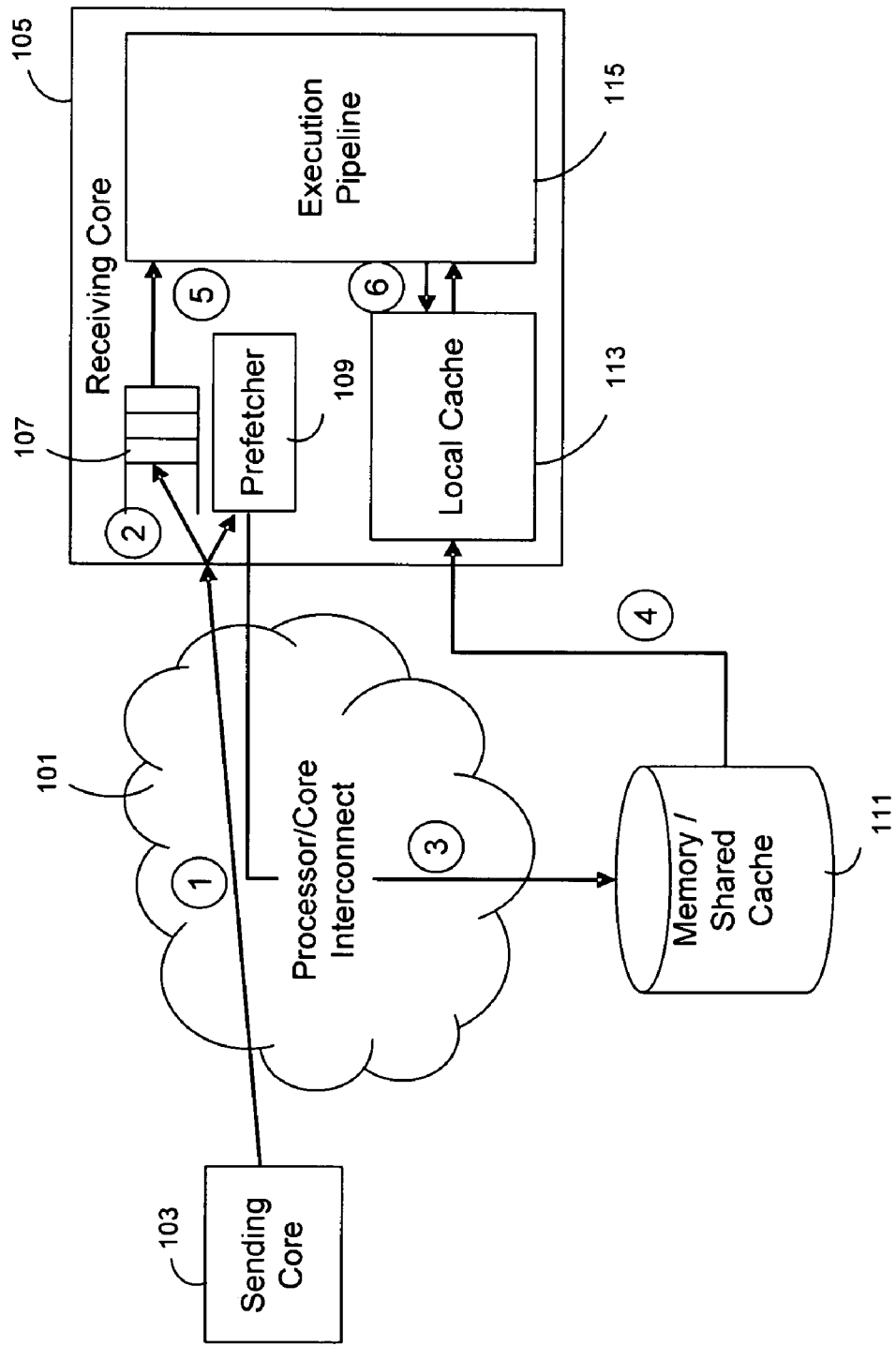
FIG. 1 is a block diagram of a multi-core processor using message passing prefetching, according to an embodiment of the invention.

Two types of architectures exist for message-passing hardware today. The first hardware architecture for message passing is where the messages are sent to the receiving core(s) over an interconnect, such as a point to point (pTp) interconnect as described below, and are queued in one or more hardware queues on the receiving core. The second is where the messages are sent to a separate hardware unit where they are queued in hardware queues that are shared across multiple cores. For example, the IXP2xxx processors contain a hardware queuing unit that is accessible by all cores and can be used to send messages between any set of cores. This invention is most useful in the first architecture, as the coupling of hardware queues and prefetchers is most easily done when the two are physically close, however both architectures could be made to use embodiments of the disclosed invention. For the first architecture option, an exemplary embodiment is shown in FIG. 1. The circled numbers in the diagram represent a possible sequence for a method for sending a pointer message from one core to another.

For purposes of description, a message passing mechanism may be referred to as an "interconnect" for message passing. The interconnect, as described, may be either a hardware, firmware or software construct, or any combination of the three. It will be understood that the platform architecture will often dictate the configuration of the interconnect.

Figure 2:
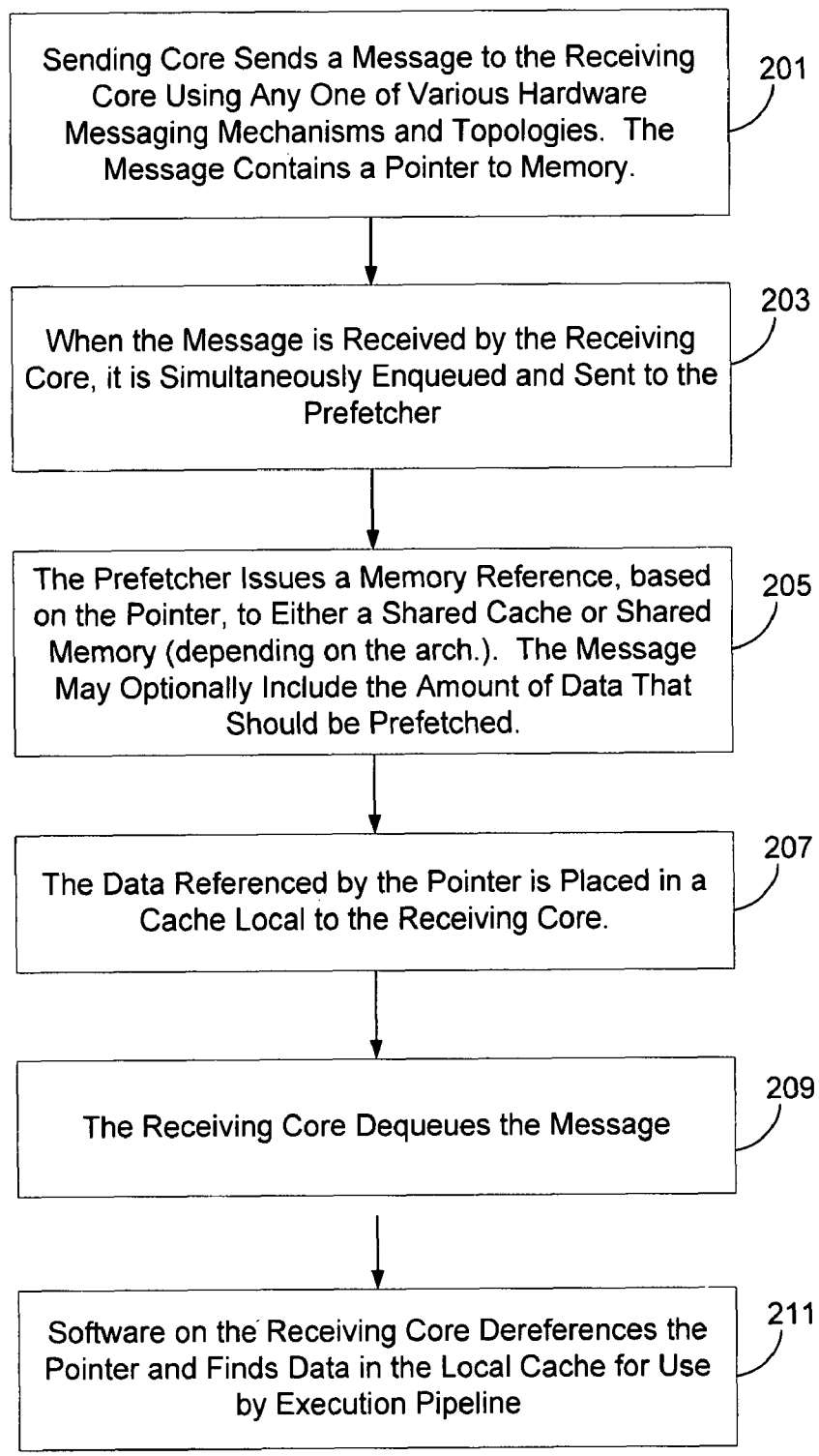
FIG. 2 is a flow diagram of an exemplary method for prefetching data referenced in a passed message, according to an embodiment of the invention.

FIG. 2 is a flow diagram showing the exemplary method illustrated in FIG. 1. FIGS. 1 and 2 will be discussed in tandem, below. In an embodiment implemented on a platform with a processor/core interconnect 101, for instance a point to point (pTp) interconnect architecture, (1) the sending core 103 sends a message to the receiving core 105 using a hardware messaging mechanism, in block 201. It will be understood that various mechanisms and topologies for core message passing may be used. (2) When the message is received by the receiving core 105, the message is simultaneously enqueued 107 and sent to the prefetcher 109, in block 203. A queue 107 may be a set of registers or memory on the core that is close to the prefetcher. (3) The prefetcher 109 issues a memory reference to either a shared cache or shared memory 111 (depending on the architecture), in block 205. Cache is hierarchical, so data may be retrieved from a lower level cache, or shared memory, as necessary. The message may optionally include the amount of data that should be prefetched. (4) The data referenced by the pointer is placed in a cache 113 local to the receiving core 105, in block 207. (5) The receiving core 105 dequeues the message from the queue 107, in block 209. (6) The pointer is dereferenced and the data is found in the cache 113 to be used in the execution pipeline 115, in block 211. In embodiments, software may be used as the mechanism for dequeuing messages and for dereferencing pointers.

In existing systems such as a dual-core processor such as the Intel® Core™ 2 Duo processor, each core has its own L1 cache and a shared L2 cache. The L1 caches have their own hardware prefetcher. The L1 prefetcher prefetches data from the L2 cache to the L1 cache. The cache prefetcher tries to guess what data will likely be needed. If the prefetch misses, i.e., the data is not in the L2 cache, then the cache prefetcher retrieves the data from memory. The L2 cache has a hardware prefetcher which retrieves data directly from memory. However, in existing systems, these cache prefetchers only work in conjunction with the execution pipeline.

The queue 107 may be polled by the execution pipeline 115 or initiate an interrupt handler (interrupt service routine) to alert the pipeline that a message has been received. In embodiments, more than one queue may be used. For instance, some messages may contain executable instructions. Other messages may contain result data from operations performed on the sending core. Yet other messages may contain alerts (or interrupts) that request work be done on the receiving processor or indicate completion of work done by the sending processor. A message may or may not include an address reference to be prefetched. Specialized queues may be implemented to correspond to various message types. A single queue may be implemented to hold all message types. It will be understood that for a single queue, various methods may be used to indicate the type of message to be consumed by the execution pipeline.

In order to flexibly support memory pointer and non-pointer messages, the software needs a mechanism to identify to the hardware whether or not the message contains a pointer. This may be done for each message, with the sending software setting a flag when it sends a message, to indicate that the message contains a pointer. Pointer identification may also be implemented as an attribute of the queue itself. For instance, a particular queue may contain only messages that have pointers.

Embodiments of the invention perform more efficiently when the sender of the message has reason to believe that the data in physical memory at the time of sending will still be in physical memory at the same location when the message is received. Thus, this invention works best when the data referenced by pointers passed between cores has a long-term mapping to physical memory. Also, the software using this feature must ensure that the data referenced by the pointer is in cacheable memory. These restrictions are reasonable in many environments, including operating system data structures and network packets.

As discussed above, cache prefetchers may be implemented in a platform. In an embodiment, one or more core-core message queues 107 utilize an additional prefetcher 109 to communicate with the execution pipeline. In another embodiment, an existing hardware prefetcher may be modified to accommodate core-core message passing prefetching. One mechanism may be implemented similar to what is being done in existing systems for Direct Cache Access. In existing systems, a prefetcher may have a pending queue of outgoing prefetch requests to be sent to the cache hierarchy. The specific implementations vary by platform. One method to connect an existing prefetcher with the message queue involves a simple multiplexer. Specifically, the message physical address that is written into the message queue would simply continue on (via dedicated wires) to the prefetcher's pending queue. A multiplexer arbitrates between normal prefetcher requests and these "hints" from the message queue. Since the prefetcher's pending queue contains physical address requests, the hint's physical address simply becomes a prefetch request to the cache hierarchy.

It will be understood that there are many ways to expose an interface to software to allow software to configure and/or use this core message prefetching feature. If the decision of pointer messages or non-pointer messages is an attribute of the queue hardware, then the interface may be manipulated using control registers, or registers mapped into the memory or I/O space of the core. If the decision of whether a message is a pointer message or a non-pointer message is made for each message sent, the interface to software may be coupled with the interface to the queue feature itself. For example, if messages are sent via an instruction in the instruction set, a flag may be specified as an additional operand to the instruction. Other options for implementation include using a control register local to the sending core.

In existing multi-core/-processor systems, when messages that contain address pointers are sent between cores, and the receiving core dereferences the pointer, a pipeline stall often occurs because the data must be fetched from either physical memory or from the coherent cache of the sending processor. Embodiments of the present invention enable faster pipeline execution on the receiving core because integrating prefetching with core messaging makes it more likely that the data will already be in, or on its way to, the local cache when the pointer is dereferenced.

It should be noted that there are many different existing methods of implementing message-passing (both hardware and software) and prefetching (often hardware) in general, and this invention may be implemented with any variety of messaging and prefetching schemes. No known art combines these techniques to provide the advantages discussed above.

Figure 3:
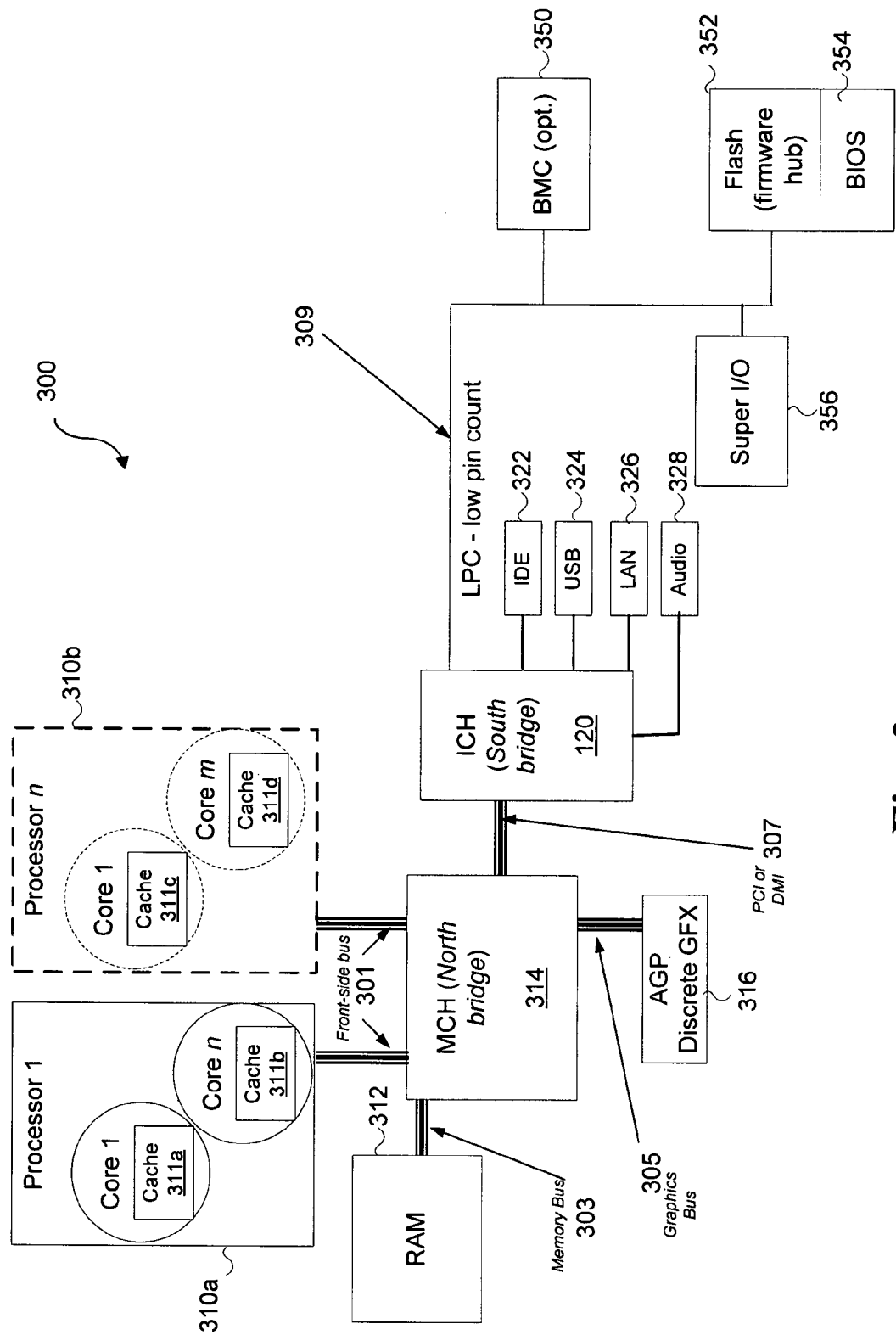
FIG. 3 is a block diagram of a multi-core processor on which embodiments of the invention may be implemented.

An embodiment of the invention may be implemented on a platform as illustrated in FIG. 3. The platform 300 may have one or more processors 310. An exemplary platform 300 is illustrated with two processors 310*a-b*. However, it will be understood that any number of processors 1-*n* may be present on the platform. Processors 310*a-b* are shown comprising two cores each 311*a-b* and 311*c-d*, but it will be understood that the processors may have more than two cores each. In another embodiment, a single processor with multi-cores may be used. The processors 310*a-b* may communicate with a memory controller hub (MCH) 314, also known as North bridge, via the front side bus 301. The MCH 314 communicates with system memory 312 via a memory bus 303. The MCH 314 may also communicate with an advanced graphics port (AGP) 316 via a graphics bus 305. The MCH 314 may communicate with an I/O controller hub (ICH) 320, also known as South bridge, via a direct module interface (DMI) bus 307. Some older platforms may use a peripheral component interconnect (PCI) bus for communication between the MCH 314 and ICH 320. The ICH 320 may be coupled to one or more components such as PCI hard drives (not shown), legacy components such as IDE 322, USB 324, LAN 326 and Audio 328, and a Super I/O (SIO) controller 356 via a low pin count (LPC) bus 356.

Processor 310 may be any type of multi-core processor capable of executing software, such as a microprocessor, digital signal processor, microcontroller, or the like.

Memory 312 may be a hard disk, a floppy disk, random access memory (RAM), read only memory (ROM), flash memory, or any other type of medium readable by processor 310. Memory 312 may store instructions for performing the execution of method embodiments of the present invention.

Non-volatile memory, such as Flash memory 352, may be coupled to the IO controller via a low pin count (LPC) bus 309. The BIOS firmware 354 typically resides in the Flash memory 352 and boot up will execute instructions from the Flash, or firmware.

In some embodiments, platform 300 is a server enabling server management tasks. This platform embodiment may have a baseboard management controller (BMC) 350 coupled to the ICH 320 via the LPC 309.

In other embodiments, a platform conforming to a point to point (pTp) interconnect architecture may be used. An area of current technological development relates to reliability, availability, and serviceability (RAS). Current systems based on the Front Side Bus (FSB) architecture do not permit hot plug of an individual bus component. Likewise, the current systems suffer from pin limitation, due to conveying initialization values and also suffer from performing multiple warm resets due to initial Power-On Configuration (POC) values are incorrect.

Figure 4:
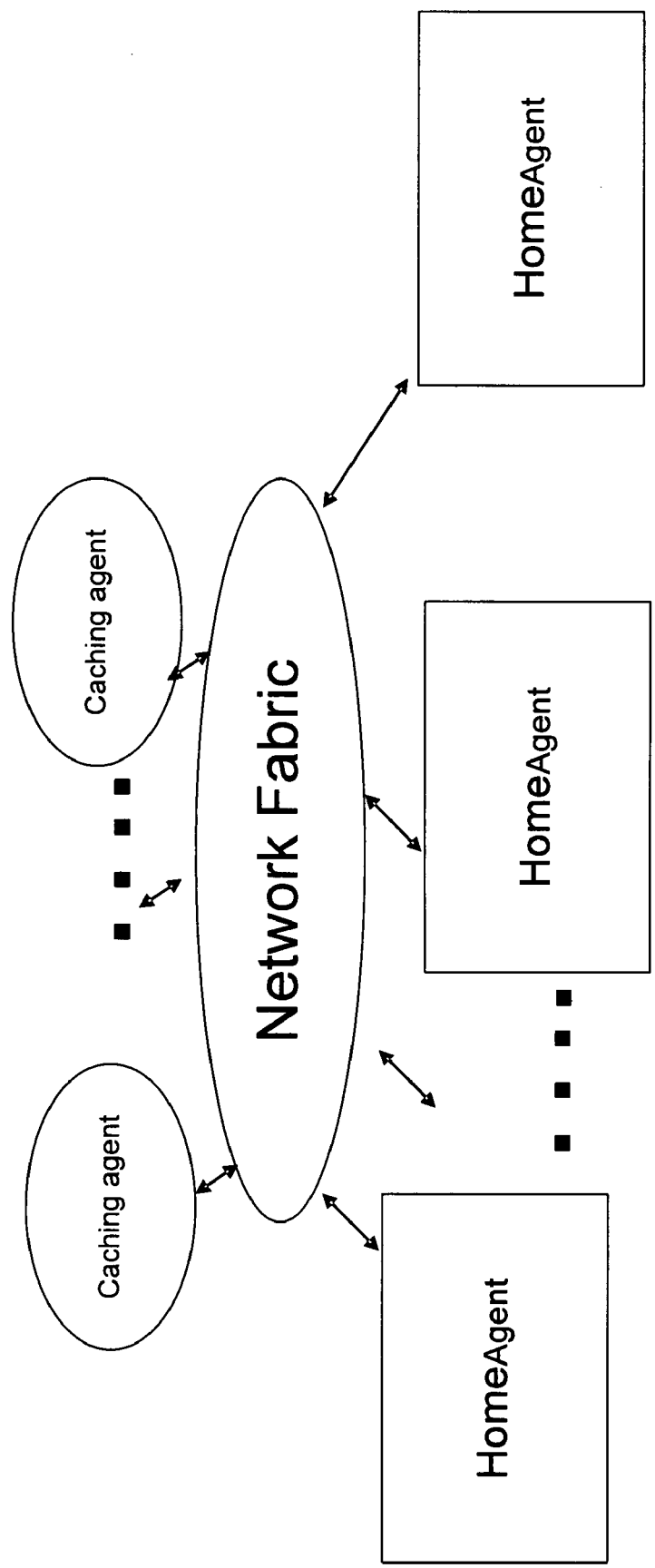
FIG. 4 is a block diagram of a protocol architecture as utilized by one embodiment.

In an embodiment, a point to point (pTp) architecture platform supports a layered protocol scheme, which is discussed further, below. FIG. 4 illustrates one example of a cache coherence protocol's abstract view of the underlying network.

FIG. 4 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, or a transport layer. The fabric facilitates transporting messages from one protocol (home or caching agent) to another protocol for a point to point network. In one aspect, the figure depicts a cache coherence protocol's abstract view of the underlying network.

Figure 5:
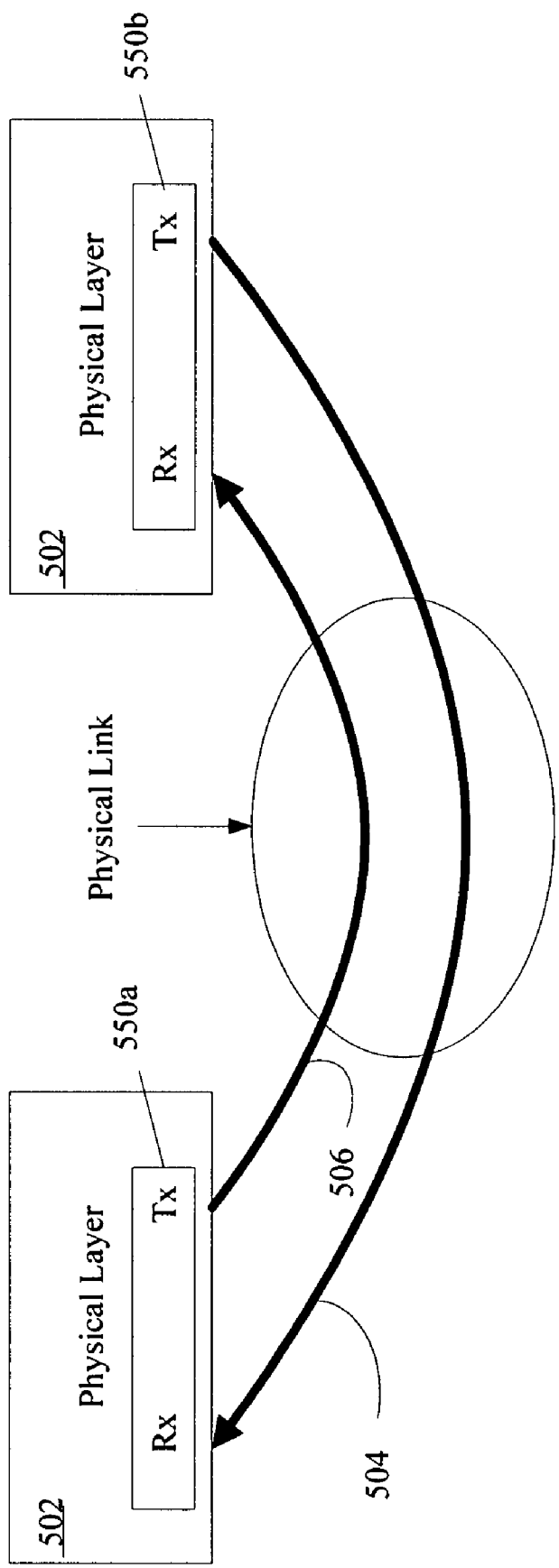
FIG. 5 is a block diagram of an apparatus for a physical interconnect utilized in accordance with the claimed subject matter.

FIG. 5 is a block diagram of an apparatus for a physical interconnect utilized in accordance with embodiments of the invention described herein. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 504 from a first transmit port 550*a* of a first integrated device to a first receiver port 550*b* of a second integrated device. Likewise, a second uni-directional link 506 from a first transmit port 550*b* of the second integrated device to a first receiver port 550*a* of the first integrated device. However, the claimed subject matter is not limited to two uni-directional links. One skilled in the art will appreciate the claimed subject matter supports any known signaling techniques, such as, bi-directional links, etc.

Figure 6B:
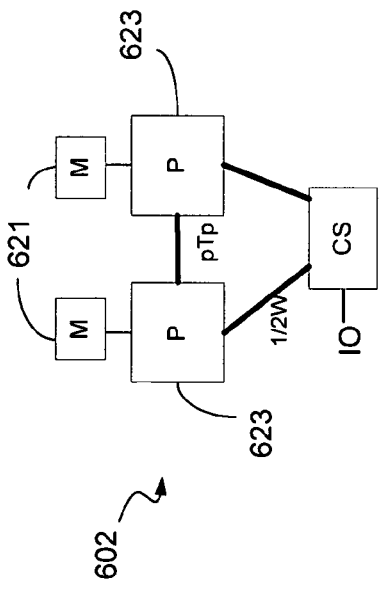
FIGS. 6A-C are multiple embodiments of a system as utilized by multiple embodiments.
Figure 6C:
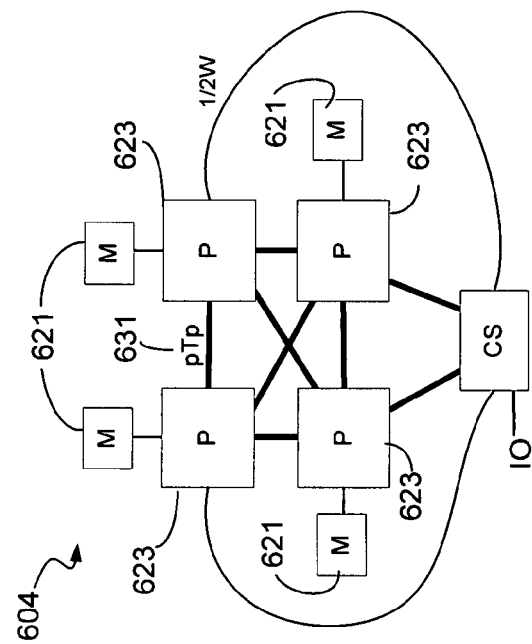
Figure 6A:
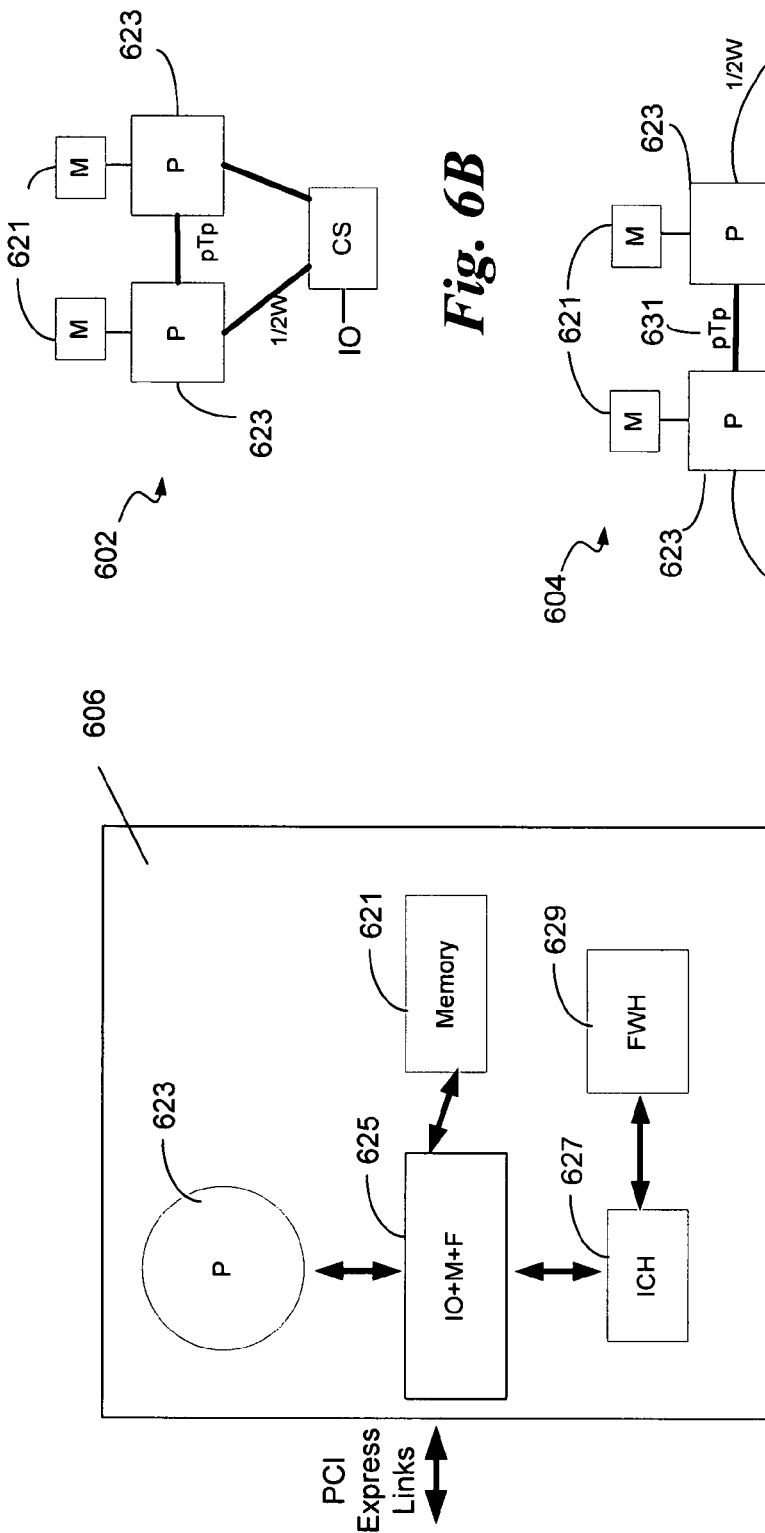

FIGS. 6A-C depict various point to point systems with one or more processors. The claimed subject matter may comprise several embodiments, for instance, one with one processor 606 (FIG. 6A), one with two processors (P) 602 (FIG. 6B) and one with four processors (P) 604 (FIG. 6C). In embodiments 602 and 604, each processor is coupled to a memory (M) 621 and is connected to each processor 623 via a network fabric which may comprise either or all of: a link layer, a protocol layer, a routing layer, a transport layer, and a physical layer. The fabric facilitates transporting messages from one protocol (home or caching agent) to another protocol for a point to point network. As previously described, the system of a network fabric supports any of the embodiments depicted in connection with FIGS. 4-6.

For embodiment 606, the uni-processor P 623 is coupled to graphics and memory control 625, depicted as IO+M+F, via a network fabric link that corresponds to a layered protocol scheme. The graphics and memory control is coupled to memory and is capable of receiving and transmitting via peripheral component interconnect (PCI) Express Links. Likewise, the graphics and memory control is coupled to the input/output controller hub (ICH) 627. Furthermore, the ICH 627 is coupled to a firmware hub (FWH) 629 via a low pin count (LPC) bus. Also, for a different uni-processor embodiment, the processor would have external network fabric links. The processor may have multiple cores with split or shared caches with each core coupled to an X-bar router and a non-routing global links interface. An X-bar router is a pTp interconnect between cores in a socket. X-bar is a "cross-bar" meaning that every element has a cross-link or connection to every other. This is typically faster than a pTp interconnect link and implemented on-die, promoting parallel communication. Thus, the external network fabric links are coupled to the X-bar router and a non-routing global links interface.

An embodiment of a multi-processor system comprises a plurality of processing nodes 623 interconnected by a point-to-point network 631 (indicated by thick lines between the processing nodes). For purposes of this discussion, the terms "processing node" and "compute node" are used interchangeably. Links between processors are typically full, or maximum, width, and links from processors to an IO hub (IOH) chipset (CS) are typically half width. Each processing node 623 includes one or more central processors 623 coupled to an associated memory 621 which constitutes main memory of the system. In alternative embodiments, memory 621 may be physically combined to form a main memory that is accessible by all of processing nodes 623. Each processing node 623 may also include a memory controller 625 to interface with memory 621. Each processing node 623 including its associated memory controller 625 may be implemented on the same chip. In alternative embodiments, each memory controller 625 may be implemented on a chip separate from its associated processing node 623.

Each memory 621 may comprise one or more types of memory devices such as, for example, dual in-line memory modules (DIMMs), dynamic random access memory (DRAM) devices, synchronous dynamic random access memory (SDRAM) devices, double data rate (DDR) SDRAM devices, or other volatile or non-volatile memory devices suitable for server or general applications.

The system may also include one or more input/output (I/O) controllers 627 to provide an interface for processing nodes 623 and other components of system to access to I/O devices, for instance a flash memory or firmware hub (FWH) 629. In an embodiment, each I/O controller 627 may be coupled to one or more processing nodes. The links between I/O controllers 627 and their respective processing nodes 623 are referred to as I/O links. I/O devices may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. I/O devices may be wire-lined or wireless. In one embodiment, I/O devices may include a wireless transmitter and a wireless transmitter receiver.

The system may be a server, a multi-processor desktop computing device, an embedded system, a network device, or a distributed computing device where the processing nodes are remotely connected via a wide-area network.

In the embodiment as shown in FIG. 6C, network 631 provides partial connectivity for processing nodes 623. Thus, every processing node 623 is directly connected to some, but perhaps not all, of the other processing nodes. A processing node 623 is connected to another processing node via a direct link or via an indirect connection (e.g., using another processor as a go-between).

A type of message carried by network 631 is a snoop message, which contains information about a memory transaction that may affect the coherency state of a data item in caches (not shown). A memory transaction refers to a transaction that requires access to any memory device 621 or any cache. When any processing node performs a memory transaction, the processing node issues a snoop message (or equivalently, snoop request) on network 621 to request all of the other processing nodes to verify or update the coherency states of the data items in their respective local caches. I/O controllers 627 also issues and receives snoop messages when performing a direct memory access (DMA). Thus, any of processing nodes 623 and I/O controllers 627 may be a requesting node for a snoop message and a destination node for another snoop message.

When a first processing node sends a snoop message to a second processing node which is not directly connected to first processing node, the first and second processing nodes use a third processing node as a forwarding node. In this scenario, a third processing node serves as a forwarding node that forwards the snoop message to both processing the first and second processing nodes. The forwarding may be performed by a fan-out mechanism which replicates the incoming snoop message and forwards the replicated messages to different destinations.

Figure 7:
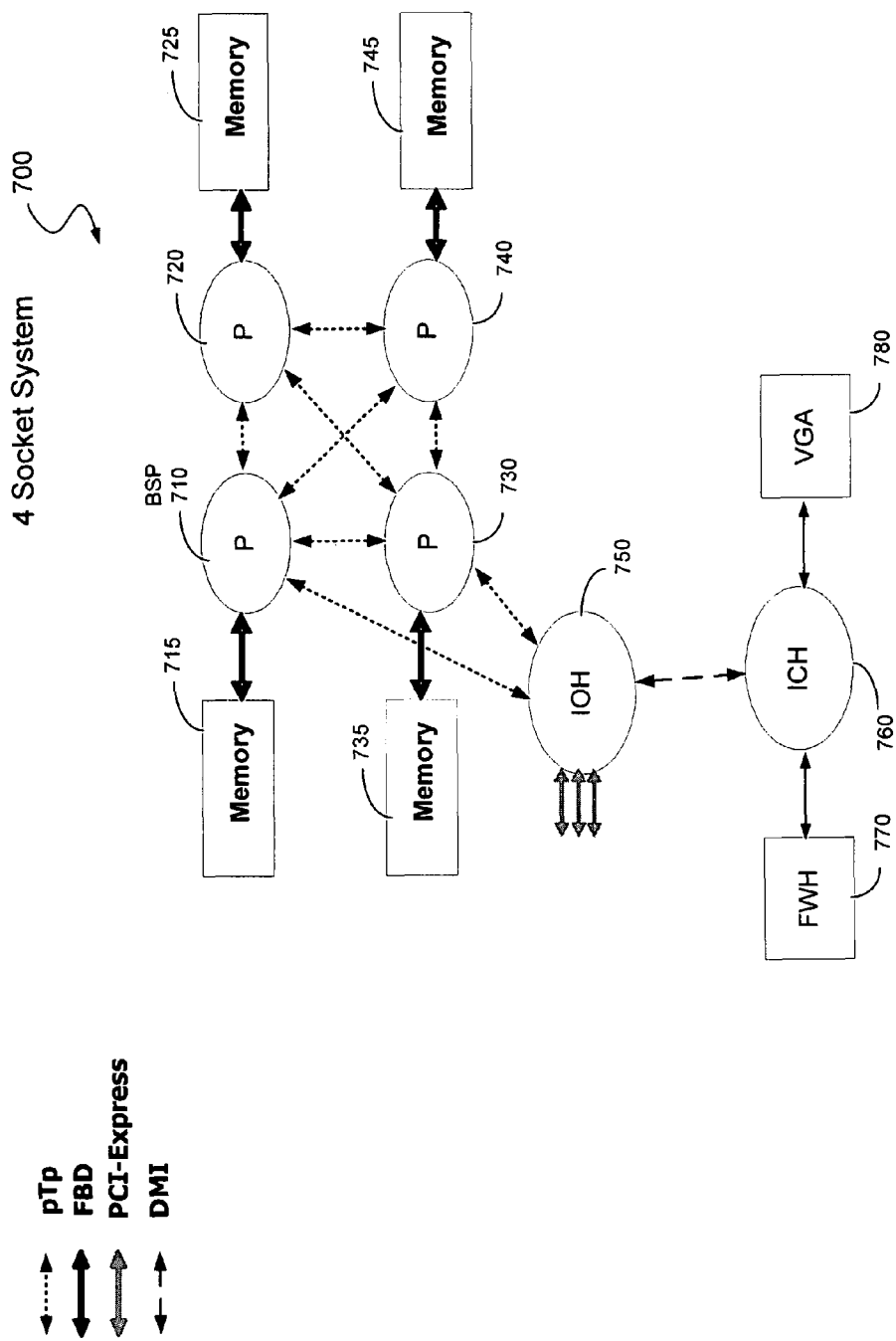
FIG. 7 illustrates a four-socket, multi-core system, according to embodiments of the invention.

FIG. 7 illustrates a four-socket system 700 according to embodiments of the invention. Processors 710, 720, 730 and 740 may include any number of cores. Each of the processors 710, 720, 730 and 740 has a memory coupled to it, 715, 725, 735 and 745, respectively. The dotted lines between processors indicated a pTp interconnect bus. The bolded lines between a processor and its memory indicate a FBD connection. Some of the processors, 710 and 730 in this example, may be connected to an input/output hub (IOH) 750 via the pTp interconnect bus. The IOH 750 may be coupled with a number of devices (not shown) via a number of peripheral component interconnect express (PCI-e) buses, as indicated by grey lines. The IOH 750 is coupled to the input/output controller hub (ICH) 760, via a direct media interface (DMI) bus, as shown with dashed lines. The ICH 760 may be coupled to a firmware hub (FWH) 770 and a video graphics adapter (VGA) 780.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multi-core multiprocessor systems, minicomputers, mainframe computers, as well as pervasive or miniature computers or processors that may be embedded into virtually any device.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for speculative prefetching in a multi-core message-passing platform, comprising:
    at least one processor, each of the at least one processor having at least one core, where the system comprises a plurality of cores;
    a receiving core of the plurality of cores having a local cache, at least one message queue to store received messages, and a message passing prefetcher communicatively coupled to at least one of a shared cache or shared memory, and also coupled to the local cache;
    an interconnect for passing messages among the plurality of cores; and
    a sending core of the plurality of cores to send a message to the receiving core, wherein a message having a memory reference is sent to both the at least one message queue and the message passing prefetcher of the receiving core, and
    wherein the message passing prefetcher is configured to speculatively fetch data referenced in a received message, where the fetched data is in one of a local cache, shared cache, or cache local to a core other than the receiving core, or shared memory.

2. The system as recited in claim 1, wherein at least one core of the plurality of cores further comprises at least one execution pipeline prefetcher separate from the message passing prefetcher.

3. The system as recited in claim 1, wherein at least one core of the plurality of cores further comprises an execution pipeline prefetcher in a same prefetcher unit as the message passing prefetcher, wherein a multiplexer arbitrates between execution pipeline prefetch requests and message queue prefetch requests.

4. The system as recited in claim 1, wherein the platform comprises a point to point interconnect architecture where a message is sent to the receiving core over an interconnect and the message is queued in one or more hardware queues on the receiving core.

5. The system as recited in claim 4, further comprising an execution pipeline to identify when a new message is received, wherein the execution pipeline either polls the at least one message queue to determine if a new message has arrived or an interrupt is initiated upon receipt of a message in the at least one message queue to notify the execution pipeline that a new message has arrived.

6. The system as recited in claim 1, wherein the message further comprises a number of bytes to prefetch.

7. The system as recited in claim 1, wherein a first message queue is to be used to store messages having a memory reference, and at least one other message queue is to store messages not having a memory reference.

8. The system as recited in claim 7, further comprising means to select a message queue for storing messages having a memory reference.

9. The system as recited in claim 1, wherein a single queue is used to store messages both having and not having a memory reference, further comprising means to identify a type of the stored message.

10. The system as recited in claim 9, wherein the means to identify a type of the stored message further comprises a flag corresponding to the message, the flag to indicate a message type, wherein the flag is stored in one of the message or a control register.

11. The system as recited in claim 9, wherein the means to identify a type of the stored message further a queue attribute associated with the message queue to indicate a message type of all messages in the queue.

12. A system for speculative prefetching in a multi-core message-passing platform, comprising:
    at least one processor, each of the at least one processor having at least one core, wherein the system comprises a plurality of cores;
    a receiving core of the plurality of cores having a local cache;
    a separate hardware unit shared among the plurality of cores for queuing messages in at least one hardware message queue, the at least one hardware message queue to store received messages for the receiving core;
    a message passing prefetcher communicatively coupled to the separate hardware unit, at least one of a shared cache or shared memory, and the receiving core;
    an interconnect for passing messages among the plurality of cores via the separate hardware unit; and
    a sending core of the plurality of cores to send a message to the receiving core via the separate hardware unit, wherein a message having a memory reference is sent to both the at least one hardware message queue and the message passing prefetcher of the receiving core,
    wherein the message passing prefetcher is configured to speculatively fetch data referenced in a received message, where the fetched data is stored in one of a local cache, shared cache, cache local to a core other than the receiving core, or shared memory.

13. The system as recited in claim 12, wherein at least one core of the plurality of cores further comprises at least one execution pipeline prefetcher separate from the message passing prefetcher.

14. The system as recited in claim 12, wherein at least one core of the plurality of cores further comprises an execution pipeline prefetcher in a same prefetcher unit as the message passing prefetcher, wherein a multiplexer arbitrates between execution pipeline prefetch requests and message queue prefetch requests.

15. The system as recited in claim 14, further comprising an execution pipeline to identify when a new message is received, wherein the execution pipeline either polls the at least one message queue to determine if a new message has arrived or an interrupt is initiated upon receipt of a message in the at least one message queue to notify the execution pipeline that a new message has arrived.

16. The system as recited in claim 12, wherein a first message queue is to be used to store messages having a memory reference, and at least one other message queue is to store messages not having a memory reference.

17. The system as recited in claim 16, further comprising means to select a message queue for storing messages having a memory reference.

18. The system as recited in claim 12, wherein a single queue is used to store messages both having and not having a memory reference, further comprising means to identify a type of the stored message.

19. The system as recited in claim 18, wherein the means to identify a type of the stored message further comprises a flag corresponding to the message, the flag to indicate a message type, wherein the flag is stored in one of the message or a control register.

20. A machine implemented method for speculative prefetching in a multi-core message-passing platform, comprising:
   sending a message by a sending core, the message having a memory reference pointer and being sent to a receiving core;
   receiving the message by the receiving core;
   simultaneously queuing the message in a message queue and forwarding the message to a message prefetcher;
   issuing a memory reference by the message prefetcher, based on the memory reference pointer to retrieve referenced memory;
   storing the data retrieved corresponding to the memory reference in a cache local to the receiving core;
   dequeuing the message from the message queue, by the receiving core; and
   dereferencing the memory reference pointer; and
   retrieving the data stored in the cache local to the receiving core.

21. The method as recited in claim 20, wherein the data is retrieved from one of a local cache, shared cache, cache local to a core other than the receiving core, or shared memory.

22. The method as recited in claim 20, wherein the message further comprises a number of bytes to prefetch.

23. The method as recited in claim 20, wherein the message prefetcher is one of a same prefetcher as used by an execution pipeline or a separate prefetcher not used by the execution pipeline.

24. A machine readable storage medium having instructions for speculative prefetching in a multi-core message-passing platform, the instructions stored therein and when executed by a machine cause the machine to:
   send a message by a sending core, the message having a memory reference pointer and being sent to a receiving core;
   receive the message by the receiving core;
   simultaneously queue the message in a message queue and forward the message to a message prefetcher;
   issue a memory reference by the message prefetcher, based on the memory reference pointer to retrieve referenced memory;
   store the data retrieved corresponding to the memory reference in a cache local to the receiving core;
   dequeue the message from the message queue, by the receiving core; and
   dereference the memory reference pointer; and
   retrieve the data stored in the cache local to the receiving core.

25. The medium as recited in claim 24, wherein the data is retrieved from one of a local cache, shared cache, cache local to a core other than the receiving core, or shared memory.

26. The medium as recited in claim 25, wherein the message further comprises a number of bytes to prefetch.

27. The medium as recited in claim 25, wherein the message prefetcher is one of a same prefetcher as used by an execution pipeline or a separate prefetcher not used by the execution pipeline.

* * * * *